United States Patent [19]

Bil et al.

[11] Patent Number: 5,514,301
[45] Date of Patent: May 7, 1996

[54] COMPOSITIONS FOR DEWETTING OR DEGREASING SOLID SURFACES

[75] Inventors: Martine Bil, Villeneuve D'Asq; Jean-Charles Boussaguet, Aubergenville; Daniel Desbiendras, Villetaneuse; Stéphane Fouquay, Mont Saint-Aignan; Pascal Michaud, Saint-Gratien, all of France

[73] Assignee: Elf Atochem S.A., Puteaux, France

[21] Appl. No.: 65,339

[22] Filed: May 21, 1993

[30] Foreign Application Priority Data

May 21, 1992 [FR] France .................. 92 06201

[51] Int. Cl.$^6$ .............. C11D 1/00; C11D 1/62; C11D 1/40
[52] U.S. Cl. ............. 252/545; 252/547; 252/548
[58] Field of Search .................. 252/545, 547, 252/548

[56] References Cited

U.S. PATENT DOCUMENTS 3,714,075  1/1973  Johnson .................. 252/545
4,594,177  6/1986  Lantz et al. .

FOREIGN PATENT DOCUMENTS 1541592  10/1967  France .
2522007   2/1982  France .
1168710  10/1969  United Kingdom .
WO86/00329  1/1986  WIPO .

Primary Examiner—E. Rollins Cross
Assistant Examiner—E. D. Irzinski
Attorney, Agent, or Firm—Spencer & Frank

[57] ABSTRACT

The subject of the invention is dewetting or degreasing compositions based on halogenated aliphatic solvents containing in solution at least one mono- or dialkyl phosphate of a fluorinated amine, at least one quaternary ammonium mono- or dialkylphosphate and optionally a quaternary ammonium chloride.

14 Claims, No Drawings

COMPOSITIONS FOR DEWETTING OR DEGREASING SOLID SURFACES

FIELD OF THE INVENTION

The present invention relates to the field of surface treatment and, more particularly, has as subject new compositions for removing water or greases found on the surface of various substrates such as, for example, metal products, glass and plastic materials.

BACKGROUND OF THE INVENTION

Devices and compositions for the continuous dewetting of surfaces are already known and were described, for example, in Patents FR 1,541,592, FR 2,229,308 and U.S. Pat. No. 4,182,687. The last particularly describes a dewetting composition consisting of a chlorofluorocarbon, principally 1,1,2-trichloro-1,2,2-trifluoroethane, containing a quaternary ammonium mono- or dialkyl phosphate as surface-active agent. This surface-active agent can be formed in situ by reaction of a mono- or dialkylphosphoric acid, a quaternary ammonium chloride and an alkylamine in the chlorofluorocarbon.

In a continuous drying process which involves the separation of the entrained water before the recycling of the dewetting composition, it is desirable that the emulsion formed by the dewetting composition with the extracted water rapidly should separate into two phases in order to allow the aqueous layer to be removed before the dewetting composition is recycled.

In order to improve the rate of deemulsification of dewetting compositions based on quaternary ammonium mono- or dialkyl phosphate, Patent FR 2,522,007 recommended the replacement of the alkylamine of U.S. Pat. No. 4,182,687 by a fluorinated amine of general formula:

(I)

in which $R_F$ represents a linear or branched perfluoroalkyl radical containing from 2 to 20 carbon atoms, X denotes an optionally partially halogenated, divalently-bonded group, and the symbols $R^1$ and $R^2$, which are identical or different, each represent a hydrogen atom or an alkyl or hydroxyalkyl radical containing 1 to 4 carbon atoms.

The dewetting compositions of this French Patent are prepared by mixing, in the chlorofluorocarbon solvent, a mono- or dialkylphosphoric acid of general formula:

(II)

in which p is a number ranging from 1 to 2 and R denotes a linear or branched alkyl radical containing from 1 to 18 carbon atoms, a quaternary ammonium chloride of general formula:

(III)

in which R' denotes a linear or branched alkyl radical containing from 6 to 18 carbon atoms and R" is a methyl or ethyl radical, and a fluorinated amine of formula (I) above. This method of preparation leads to the formation of a precipitate of the hydrochloride of the fluorinated amine which it is desirable to remove by filtration to give a perfectly homogeneous dewetting composition.

It has now been found that the de-emulsification time can be considerably reduced further and the separation of the aqueous and organic phases thus accelerated by replacing a portion of the fluorinated amine by an alkaline base and by introducing the quaternary ammonium chloride of formula (III) last. This additionally allows a precipitation, even partial, of the hydrochloride of the fluorinated amine to be avoided.

DESCRIPTION OF THE INVENTION

The principal subject of the invention is thus a dewetting composition consisting essentially of a solution of surface-active material in at least one halogenated aliphatic solvent which is liquid at room temperature and which has a boiling point not exceeding 87° C., characterized in that the surface-active material comprises at least one compound of general formula:

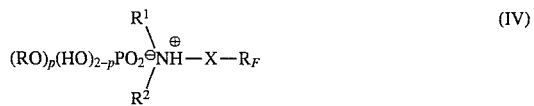
(IV)

at least one compound of general formula:

(V)

and, optionally, a compound of formula (III) above, in a proportion of 0.5 to 0.7 mol of compound(s) of formula (IV), 0.5 to 0.3 mol of compound(s) of formula (V) and 0 to 0.5 mol of compound of formula (III) per mol of compounds (IV) and (V), the symbols p, R, $R^1$, $R^2$, R', R", $R_F$ and X having the same meanings as previously.

As in the compositions of the prior art, the surface-active material content of the compositions according to the invention can vary within wide limits. This content is generally low (from 0.01 to 1% by weight) in ready-to-use dewetting compositions, but it can reach up to 30% by weight in concentrated compositions which it is sufficient to dilute in order 15 to carry out the dewetting operation.

As in the compositions of the prior art, the solvent can be a chlorofluorocarbon, in particular 1,1,2-trichloro-1,2,2-trifluoroethane known under the name CFC-113. However, the specific formulation of the surface-active material according to the invention makes it possible to use solvents other than the CFCs. Thus, without implying any limitation, it is possible to use:

hydrochlorofluorocarbons of the ethane or propane series such as, for example, 1,1-dichloro-1-fluoroethane (HCFC-141b), 1,1-dichloro-2,2,2-trifluoroethane (HCFC-123), 1,1-dichloro-2,2,3,3,3-pentafluoropropane (HCFC-225 ca) or 1,2-dichloro-1,2,3,3,3-pentafluoropropane (HCFC-225 cb);

chlorinated solvents such as, for example, methylene chloride, 1,2-dichloroethane, 1,1,1-trichloroethane, trichloroethylene or (cis or trans) 1,2-dichloroethylene;

fluorinated ethers such as, for example, methyl 2,2,3,3,3-pentafluoropropyl ether, difluoromethyl 2,2,3,3,3-pentafluoropropyl ether, methyl 2,2,3,3-tetrafluoropropyl ether, methyl 1,1,2,3,3,3-hexafluoropropyl ether and 1-chloro-1,2,2-trifluoroethyl difluoromethyl ether;

mixtures of these solvents with each other or with saturated or unsaturated hydrocarbons such as, for example, the (perfluoroalkyl)ethylenes mentioned in Patent Application EP 443911, the tertiary fluoroalkanes mentioned in U.S. Pat. No. 5,059,728 and 1,1,1,2,3,4,4,5,5,5-decafluoropentane.

The solvent is preferably chosen from nonflammable compounds. On the other hand, in the case of mixtures of solvents, azeotropic or pseudoazeotropic mixtures are preferably used.

Among the compositions according to the invention, the ones more particularly preferred are those in which the compounds (IV) and (V) are present in approximately equimolar proportions and in which the content of compounds (III) is between 0.1 and 0.5 mol, preferably approximately 0.2 mol, per mol of compounds (IV) and (V).

The compositions according to the invention can be prepared by reacting, in a halogenated aliphatic solvent or a mixture of such solvents, one mol of mono- or dialkylphosphoric acid (II) with 0.5 to 0.7 mol of fluorinated amine (I), 0.5 to 0.3 mol of an alkaline base and 0.3 to 1 mol of a quaternary ammonium chloride (III), in proportions such that the molar ratio: (amine I+alkaline base)/acid II is equal to 1, that the molar quantity of chloride III is at least equal to that of the alkaline base and that the molar ratio: (chloride III–alkaline base)/acid II is at most equal to 0.5, preferably equal to approximately 0.2. The chloride (III) must, in addition, always be introduced last. The order of introduction of the other reagents is not critical but they are preferably introduced in the following order: (II), (I), alkaline base.

As alkaline base, sodium hydroxide is preferably used but other bases can also be used, such as, for example, potassium hydroxide or sodium or potassium carbonate or bicarbonate. The alkaline base can be added as such but it is preferably introduced in the form of a solution in a $C_1$–$C_4$ lower alcohol, for example methanol.

The final addition of the compound (III) brings about the rapid formation, often immediate, of a precipitate of the alkali metal chloride which it is sufficient to separate off in order to obtain the composition according to the invention. This separation can be carried out by any known means, for example by filtering, centrifuging, decanting or extracting with water.

Although the method of preparation which has just been described is preferably used, the compositions according to the invention can also be obtained by adding a solution of at least one compound (IV), prepared separately, to a solution of at least one compound (V) and optionally one compound (III).

The fluorinated amines (I), the alkylphosphoric acids (II) and the quaternary ammonium chlorides (III) which can be used for the preparation of the compositions according to the invention are the same as those described in Patent FR 2,522,007, the content of which is incorporated here by reference.

As in the abovementioned patent, it is preferable to use:

the fluorinated amines of formula:

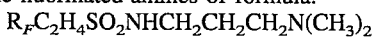

or

the acids (II) in which R is a butyl, hexyl, 2-ethylhexyl, octyl or tridecyl radical and, more particularly, the mixtures of monoalkylphosphoric acid and dialkylphosphoric acid in which the proportion by weight of the two acids is between approximately 60/40 and 40/60, the quaternary ammonium chlorides (III) in which R' is a dodecyl or octadecyl radical and R" is a methyl radical, or the commercial products containing mainly these chlorides.

The solid surfaces from which water can be removed by means of the compositions according to the invention can be very diverse, provided, however, that their substance (glass, metal, refractory material, plastic material, etc) is insoluble in and resistant to attack by the halogenated aliphatic solvent of the composition according to the invention.

Although they are more particularly intended for dewetting, the compositions according to the invention can also be used for degreasing solid surfaces.

The de-emulsification ability of the compositions according to the invention can be assessed by means of the following test:

50 ml of composition whose content of surface-active material (that is to say, the solids content) was brought to 0.4 g/kg are vigorously agitated with 20 ml of water for 30 seconds in a graduated test tube, the emulsion is then left to stand and the volume of the two phases which are perfectly clear is recorded as a function of time.

EXAMPLES

The following examples illustrate the invention without limiting it. They were carried out with commercial products, namely:

butylphosphoric acid $(C_4H_9O)_{1.5}(OH)_{0.5}PO_2H$ which exhibits the following acid values: strong acidity: 0.566 equivalent per 100 g weak acidity: 0.276 equivalent per 100 g which corresponds to a mixture containing approximately 40 % of monobutylphosphoric acid and 60 % of dibutylphosphoric acid.

Noramium M2C: mixture of various homologues of formula:

in which the distribution of the fatty chains (R') is the following:

| | |
|---|---|
| $C_8$ | 3% |
| $C_{10}$ | 6% |
| $C_{12}$ | 56% |
| $C_{14}$ | 18% |
| $C_{16}$ | 10% |
| saturated $C_{18}$ | 2% |
| unsaturated $C_{18}$ | 5% |

This commercial product contains 75% of active material and 0.161 equivalent of chloride per 100 g.

EXAMPLE 1 (Comparison)

A dewetting composition is prepared according to Example 7 of Patent FR 2,522,007 by mixing 8.32 g of Noramium M2C (i.e. 13.4 meq. Cl⁻), 2.69 g of butylphosphoric acid (i.e. 15.2 meq.) and 7.82 g (i.e. 15.2 meq.) of the fluorinated amine $C_6F_{13}C_2H_4SO_2NHCH_2CH_2CH_2N(CH_3)_2$ into 150 g of CFC-113.

After standing for 10 hours and filtering, 4.2 g of precipitate, identified as being the hydrochloride of the fluorinated amine, are collected.

The filtrate is then diluted using CFC 113 in order to bring its solids content to 0.4 g/kg and is subjected to the de-emulsification test described above. The following results were obtained:

| TIME | VOLUME (in ml) OF THE CLEAR PHASES | |
|---|---|---|
| (in minutes) | Lower phase | Upper phase |
| 3 | 43 | 14 |
| 5 | 47 | 19 |

-continued

| TIME | VOLUME (in ml) OF THE CLEAR PHASES | |
|---|---|---|
| (in minutes) | Lower phase | Upper phase |
| 10 | 50 | 20 |

EXAMPLE 2

2.69 g of butylphosphoric acid 3.91 g (i.e. 7.6 meq.) of the same fluorinated amine as in Example 1

3 g of a methanol solution containing 10% of sodium hydroxide (i.e. 7.6 meq. NaOH)

8.32 g of Noramium M2C are added successively and with stirring to 150 g of CFC-113.

This last addition causes the immediate formation of a precipitate of sodium chloride which is removed by filtering (weight of NaCl collected: 0.4 g).

Subjected to the de-emulsification test under the same conditions as previously, the filtrate leads to the following results:

| TIME | VOLUME (in ml) OF THE CLEAR PHASES | |
|---|---|---|
| (in minutes) | Lower phase | Upper phase |
| 1 | 49 | 11 |
| 2 | 50 | 20 |

EXAMPLE 3: (Comparison)

The procedure followed is as in Example 1, but replacing the CFC-113 by the same quantity of HCFC-141b.

2.5 g of the hydrochloride of a fluorinated amine are collected and the filtrate, subjected to the de-emulsification test, gives the following results:

| TIME | VOLUME (in ml) OF THE CLEAR PHASES | |
|---|---|---|
| (in minutes) | Lower phase | Upper phase |
| 3 | 30 | 2 |
| 5 | 36 | 5 |
| 10 | 43 | 13 |

EXAMPLES 4 TO 6

Example 2 is repeated, but the CFC-113 is replaced by the same weight of HCFC-141b and the quantity of Noramium M2C is varied, namely:

Example 4:9.46 g (i.e. 15.2 meq. Cl⁻)

Example 5:4.73 g (i.e. 7.6 meq. Cl⁻)

Example 6:7 g (i.e. 11.25 meq. Cl⁻)

After removing the sodium chloride precipitate (weight collected: 0.4 g in each case), the filtrate is diluted and subjected to the de-emulsification test. The following results are obtained:

| TIME | VOLUME (in ml) OF THE CLEAR PHASES | | | | | |
|---|---|---|---|---|---|---|
| | Lower phase | | | Upper phase | | |
| (in min) | Ex.4 | Ex.5 | Ex.6 | Ex.4 | Ex.5 | Ex.6 |
| 3 | 44 | 42 | 41 | 11 | 2 | 5 |
| 5 | 48 | 45 | 45 | 18 | 7 | 10 |
| 8 | 50 | — | — | 20 | — | — |
| 10 | — | 49 | 50 | — | 19 | 20 |

EXAMPLE 7

2.69 g of butylphosphoric acid 3.91 g of the same fluorinated amine as in Example 1

3 g of a methanol solution containing 10% of sodium hydroxide 7 g of Noramium M2C are added successively and with stirring to 150 g of HCFC-225 ca.

In order to remove the sodium chloride formed, the mixture is treated with 50 ml of water, stirred for 10 minutes and left to separate. Separation takes place rapidly and the concentrated solution of surface-active additive is drained off.

When this solution is subjected to the de-emulsification test, the complete separation of the lower (50 ml) and upper (20 ml) phases is obtained in only one minute.

EXAMPLE 8

22 liters of a solution prepared by diluting a composition according to Example 6 (content of surface-active material: 0.4 g/kg) with HCFC-141b are charged into the dewetting and settling tanks of a 33 liter capacity drying machine, and 11 liters of pure HCFC-141b are charged into the rinsing vessel.

A wet, stainless steel grid, originating from a previous washing and rinsing treatment in aqueous medium, is immersed in the dewetting tank for 3 minutes and then rinsed for 3 minutes in pure HCFC-141b at boiling point.

The evaluation of the drying performance was carried out in the following way:

The grid is then immersed in 100 g of absolute ethanol, the water content of which was determined beforehand by the Karl Fischer method. A new determination carried out after immersion of the grid reveals no increase in the water content, which means that the composition according to the invention makes it possible to obtain a complete removal of water.

EXAMPLE 9

In an ultrasonics machine with a total capacity of 5 liters, 1.5 liters of the composition of Example 6, diluted to 0.4 g/kg, are introduced into the degreasing vessel and 3 liters of pure HCFC-141b are introduced into the rinsing vessel, which overflows into the degreasing vessel. The contents are refluxed. Aluminium plates (5×2 cm), coated using a rag with Equateur grease (Company Lubrefor S.A.), are immersed for 3 minutes in the vessel containing the additive solution and are then rinsed for 1 minute in the rinsing vessel.

After drying in air, the quality of the degreasing is assessed by measuring the contact angle of a drop of water on the metal plate. The results are collated in the table below.

| | Contact angle |
|---|---|
| Reference plate | 10° |
| Greasy plate | 85° |
| Plate cleaned with 141b only | 53° |
| Plate cleaned with the composition of Example 6 diluted to 0.4 g/kg | 25° |

Before the grease was deposited, all the aluminium plates were cleaned for 20 minutes in an ultrasonic vessel containing a 2.5% solution of T12 detergent (special aluminium detergent from the company TECS) heated to 60° C. and then rinsed successively in running water (20 minutes), in absolute ethanol (twice by soaking and once by spraying), and in CFC 113. The plates thus cleaned and rinsed are considered to be clean and taken as standard.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

We claim:

1. Dewetting or degreasing composition consisting essentially of a solution of surface-active material in at least one halogenated aliphatic solvent which is liquid at room temperature and which has a boiling point not exceeding 87° C., characterized in that surface-active material comprises:

a) at least one compound of formula:

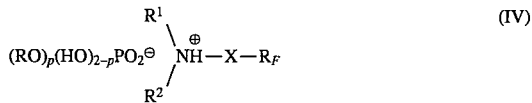

in which p is a number ranging from 1 to 2, R denotes a linear or branched alkyl radical containing from 1 to 18 carbon atoms, $R_1$ and $R_2$, which are identical or different, each represent a hydrogen atom or an alkyl or hydroxyalkyl radical containing 1 to 4 carbon atoms, $R_F$ represents a linear or branched perfluoroalkyl radical containing from 2 to 20 carbon atoms and X denotes an optionally partially halogenated, divalently-bonded group, b) at least one compound of formula:

in which p and R have the same meaning as above, R' denotes a linear or branched alkyl radical containing from 6 to 18 carbon atoms and R" is a methyl or ethyl radical, and optionally c) a compound of formula:

in which R' and R" have the same meanings as previously, in a proportion of 0.5 to 0.7 mol of compound(s) of formula (IV), 0.5 to 0.3 mol of compound(s) of formula (V) and 0 to 0.5 mol of compound of formula (III) per mol of compounds (IV) and (V).

2. Composition according to claim 1, wherein the compounds of formulae (IV) and (V) are present in approximately equimolar proportions and the content of compound (III) is between 0.1 and 0.5 mol per mol of compounds (IV) and (V).

3. Composition according to claim 1, wherein the halogenated aliphatic solvent is a chlorofluorocarbon, a hydrochlorofluorocarbon, a chlorinated solvent, a fluorinated ether or a mixture of such solvents with each other or with a saturated or unsaturated hydrofluorocarbon.

4. Composition according to claim 1 wherein the halogenated aliphatic solvent is 1,1,2-trichloro- 1,2,2-trifluoroethane, 1,1-dichloro-fluoroethane 1,1-dichloro-2,2,2-trifluoroethane or 1,1-dichloro-2,2,3,3,3-pentafluoropropane.

5. Composition according to claim 1, wherein the content of surface-active material is between 0.01 and 30% by weight.

6. Process for preparing a composition according to claim 1, comprising, in a halogenated aliphatic solvent or a mixture of such solvents, one mol of a mono- or dialkylphosphoric acid of formula:

with 0.5 to 0.7 mol of a fluorinated amine of formula:

0.5 tO 0.3 mol of an alkaline base and, lastly, 0.3 to 1 mol of a quaternary ammonium chloride of formula:

in proportions such that the molar ratio: (amine I+alkaline base)/acid II is at least equal to that of the alkaline base and the molar ratio: (chloride III−alkaline base)/acid II is at most equal to 0.5, and then separating off the alkaline chloride formed.

7. Process according to claim 6, wherein the reagents are introduced in the following order: (II), (I), alkaline base, (III).

8. Process according to claim 6, wherein the alkaline base is sodium hydroxide.

9. Process according to claim 6, wherein the alkaline chloride formed is separated off by filtering, centrifuging, decanting or extracting with water.

10. Process according to claim 6, wherein a mixture of monoalkylphosphoric acid and dialkylphosphoric acid is used in which their proportion by weight is between approximately 60/40 and 40/60.

11. Process according to claim 6, wherein the fluorinated amine is chosen from the amines of formulae:

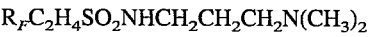
or

12. Process according to claim 6, wherein the quaternary ammonium chloride is dimethyldidodecylammonium or dimethyldioctadecylammonium chloride.

13. Process according to claim 6, wherein the molar ratio: (chloride III−alkaline base)/acid II is equal to about 0.2.

14. Composition according to claim 2, wherein the content of compound (III) is about 0.2 mol.

* * * * *

UNITED STATES PATENT AND TRADEMARK OFFICE
CERTIFICATE OF CORRECTION

PATENT NO. : 5,514,301
DATED : May 7, 1996
INVENTOR(S) : BIL, et al.

It is certified that error appears in the above-indentified patent and that said Letters Patent is hereby corrected as shown below:

Column 7, line 47, formula (V), delete " R" ", first occurrence and insert --R'--.

Column 8, line 11, delete "1,1-dichloro-fluoroethane" and insert --1,1-dichloro-1-fluoroethane,--;

line 25, delete "R$_f$"and insert --R$_F$--;

line 28, delete "tO" and insert --to--;

line 34, after "least", insert --equal to 1, the molar quantity of chloride III is at least--.

Signed and Sealed this

Sixth Day of May, 1997

Attest:

BRUCE LEHMAN

Attesting Officer      Commissioner of Patents and Trademarks